UNITED STATES PATENT OFFICE.

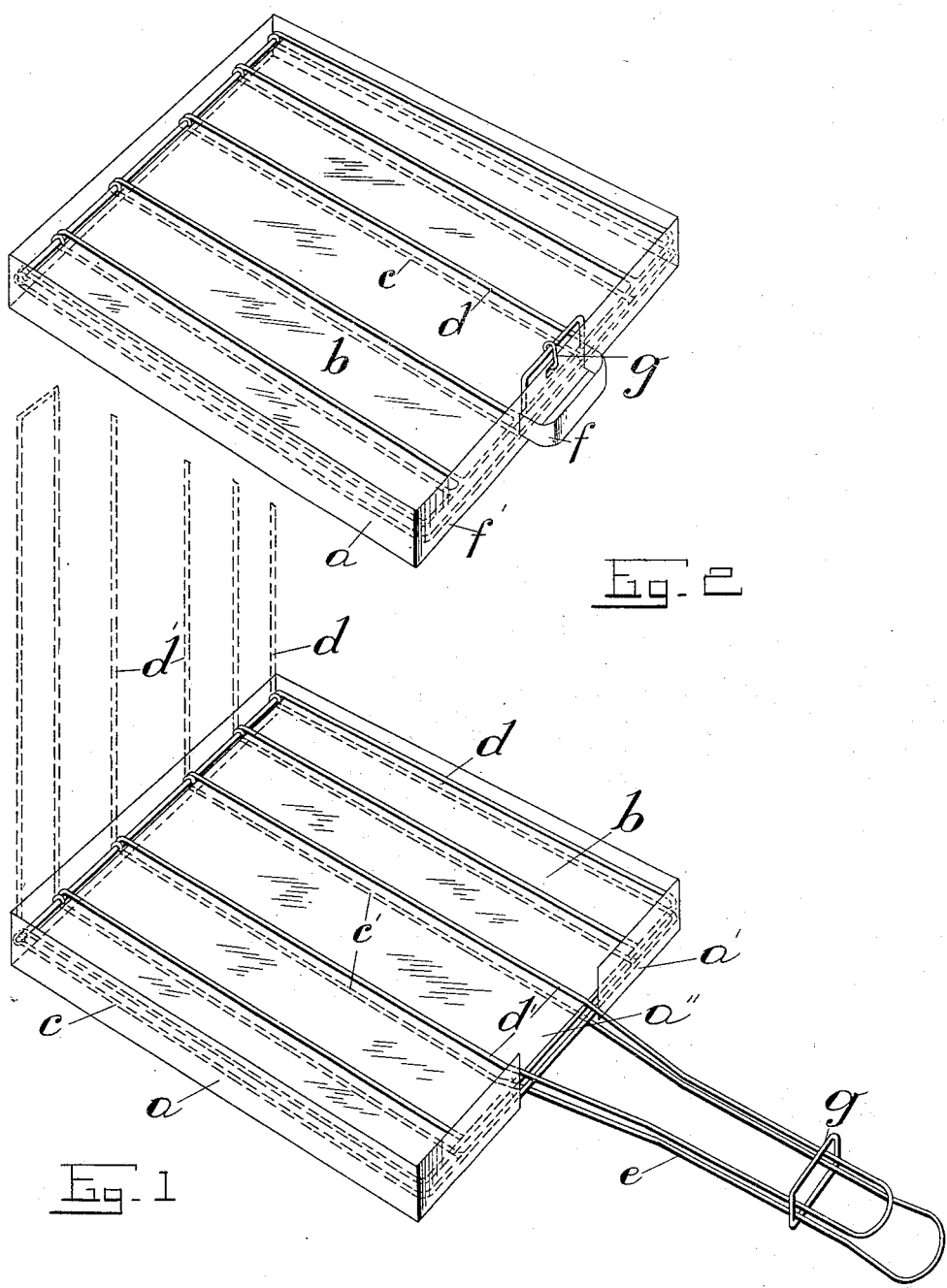

JOSEPH H. HARRISON, OF TORONTO, ONTARIO, CANADA.

FLY-CATCHER.

1,195,986.  Specification of Letters Patent.  Patented Aug. 29, 1916.

Application filed May 18, 1914. Serial No. 839,192.

*To all whom it may concern:*

Be it known that I, JOSEPH HARPER HARRISON, of the city of Toronto, in the county of York and Province of Ontario, Dominion of Canada, have invented certain new and useful Improvements in Fly-Catchers; and I hereby declare that the following is a full, clear, and exact description of the same.

My invention relates to a fly-catching device, comprising a suitably shaped frame with means therein for removably holding one or more sheets of adhesive or sticky fly-paper, said frame being provided with a suitable handle whereby the catcher can be moved violently during the pursuit of the fly or by which it can be suspended from a suitable support.

For an understanding of my invention, reference is to be had to the following description and to the accompanying drawings, in which:

Figure 1 is a perspective view of the fly catcher; and, Fig. 2, is a modification of the same.

Like characters of reference refer to like parts throughout the specification and drawings.

The fly catcher shown in Figs. 1 and 2 of the drawings consists of an open frame $a$ of any suitable shape and size, and of a convenient depth to project beyond the fly-paper $b$ contained within it, so that the fly-paper will be prevented from coming into contact with any surface upon which the fly catcher may be placed. Within the frame $a$ is a reticulated holder $c$, and opposed to the reticulated holder $c$, but separated therefrom, is a corresponding holder $d$. Between the holders $c$ and $d$ is placed the fly paper $b$, these holders securing the fly-paper in position within the frame, and the reticulations in the holders permitting of the sticky surfaces of the fly-paper being exposed therethrough.

In Fig. 1, the side $a'$ of the frame $a$ is cut away at $a''$, and the two central wires $c'$ and $d'$ of the reticulated holders $c$ and $d$ respectively are projected beyond the side $a'$ to form a handle $e$ by which the fly catcher can be moved or suspended, the holder $d$ being pivoted at one end of the frame $a$ so that it can be moved into closed position to form, with the other holder $c$, a clamp which will retain the fly-paper within the frame $a$, or it can be moved to an open position, as shown in dotted lines in the same figure, for the removal and replacement of the fly-paper.

In Fig. 2, the frame $a$ is continuous around the sides of the fly catcher and the handle $f$ is fixed to one side $f'$ of the frame. In this construction the holder $d$ is hinged to one end of the frame $a$, and the other end of the holder is free to move, suitable locking means $g$ being provided to retain the holder $d$ in its closed position when the fly-paper is introduced between it and the holder $c$.

In the use of this device, the fly catcher can be moved rapidly through the atmosphere in pursuit of a fly and when it comes in contact therewith, the adhesive character of the paper retains the fly and prevents its escape, whether the fly is killed by the force of the blow or not. When it is not convenient to pursue the fly, the fly catcher can be suspended from any suitable support and used as a stationary holder for the fly-paper, and when the paper is covered with flies the fly catcher can be placed over a flame until the paper is consumed. When the used fly-paper is consumed or removed, the holders can be opened and fresh sheets of paper can be introduced between them.

Having thus fully described the nature of my invention, what I claim as new and desire to secure by Letters Patent, is:

A fly catcher comprising an open frame having one side cut away, two reticulated holders within the frame between which the fly paper is placed, handles for the reticulated holders extending through the cut-away portion of the frame one of said holders being pivoted to the frame at the opposite side to the handle whereby it can be moved into open position for the removal or replacement of the fly paper or into closed position to form with the other holder a clamp for retaining the fly paper in position within the frame.

Toronto, May 12th, A. D. 1914.

JOSEPH H. HARRISON.

Witnesses:
 CHAS. H. RICHES,
 STANLEY RICHES.